US012240734B2

(12) United States Patent
Monzón et al.

(10) Patent No.: US 12,240,734 B2
(45) Date of Patent: Mar. 4, 2025

(54) ELEVATOR GUIDE RAIL

(71) Applicant: Otis Elevator Company, Farmington, CT (US)

(72) Inventors: Andrés Monzón, Madrid (ES); Javier García Casla, Madrid (ES); José-Manuel González-Rodil, Madrid (ES)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 18/525,019

(22) Filed: Nov. 30, 2023

(65) Prior Publication Data

US 2024/0294357 A1 Sep. 5, 2024

(30) Foreign Application Priority Data

Mar. 3, 2023 (EP) .................................... 23382197

(51) Int. Cl.
*B66B 7/02* (2006.01)

(52) U.S. Cl.
CPC ..................................... *B66B 7/02* (2013.01)

(58) Field of Classification Search
CPC ................................. B66B 7/02; B66B 7/022
See application file for complete search history.

(56) References Cited

U.S. PATENT DOCUMENTS

| | | | |
|---|---|---|---|
| 6,012,554 | A | 1/2000 | Ito et al. |
| 8,555,479 | B2 | 10/2013 | Mauermann et al. |
| 2018/0354754 | A1 | 12/2018 | Fonteneau et al. |

FOREIGN PATENT DOCUMENTS

| | | | | | |
|---|---|---|---|---|---|
| CA | 2270219 | A1 * | 5/1998 | | |
| JP | S5719267 | A | 2/1982 | | |
| JP | 2516277 | B2 * | 7/1996 | | |
| JP | H10139305 | A * | 5/1998 | | |
| JP | 2011246229 | A | 12/2011 | | |
| WO | WO-2011146071 | A1 * | 11/2011 | ............. | B66B 7/022 |
| WO | WO-2012087295 | A1 * | 6/2012 | ............. | B66B 7/022 |

OTHER PUBLICATIONS

Machine Translation of JPS 5719267.*
European Search Report for application EP 23382197.4, dated Aug. 7, 2023, 61 pages.

* cited by examiner

*Primary Examiner* — Diem M Tran
(74) *Attorney, Agent, or Firm* — CANTOR COLBURN LLP

(57) ABSTRACT

A guide rail for an elevator system has an elongate length with a cross-section perpendicular to the length; the cross-section including a base section for mounting to a wall of a hoistway, and a blade section extending from the base section; the blade section including a guide surface for interacting with a guide element of a component movable in the elevator hoistway; the guide rail including: a pair of separate rail piece parts fixed together to form the guide rail; the pair of separate rail piece parts including a first rail piece part and a second rail piece part; the first rail piece part being formed from a first thickness of sheet material bent to have a cross-section of a first predetermined shape, and the second rail piece part being formed from a second thickness of sheet material bent to have a cross-section of a second predetermined shape.

14 Claims, 10 Drawing Sheets

ELEVATOR GUIDE RAIL

FOREIGN PRIORITY

This application claims priority to European Patent Application No. 23382197.4, filed Mar. 3, 2023, and all the benefits accruing therefrom under 35 U.S.C. § 119, the contents of which in its entirety are herein incorporated by reference.

TECHNICAL FIELD

This disclosure relates to elevator guide rails made from sheet material, and to methods for manufacturing an elevator guide rail.

BACKGROUND

It is known in the art that guide rails must be installed for the whole of the height of an elevator hoistway to guide the movement of an elevator car, and in some types of systems also the counterweight. There is an increasing need to fit elevator systems into smaller overall spaces within a building, reducing the dimensions of the hoistway, whilst also requiring additional components to be housed in the hoistway rather than in machine rooms above. To fit elevator systems in more reduced spaces, refuge spaces at the top and the bottom of the hoistway are also being reduced. This reduction in space then causes problems with various hoistway components interfering with the guide rail.

Generally, guide rails are made from solid steel produced in standard lengths of 5 m, which are then mounted to the wall of the hoistway to form a guide path. There is an increasing need to adjust the base of the guide rail which mounts to the wall to prevent interference with hoistway components (e.g. a machine brake), which previously would have been located elsewhere. It is difficult to alter the base of the guide rail mounted to the wall without compromising the structural integrity of the rail itself, and doing so is time consuming and costly. There is therefore a need to produce guide rails which can be adapted for reduced space elevator systems in a more timely and cost efficient manner, whilst maintaining the structural integrity required of such components.

SUMMARY

According to a first aspect of this disclosure there is provided a guide rail for an elevator system, the guide rail having an elongate length with a cross-section perpendicular to the elongate length; the cross-section comprising a base section for mounting to a wall of an elevator hoistway, and a blade section, the blade section extending from the base section; wherein the blade section comprises a guide surface for interacting with a guide element of a component movable in the elevator hoistway; the guide rail comprising: a pair of separate rail piece parts fixed together to form the guide rail; wherein the pair of separate rail piece parts comprises a first rail piece part and a second rail piece part; the first rail piece part being formed from a first thickness of sheet material bent to have a cross-section of a first predetermined shape, and the second rail piece part being formed from a second thickness of sheet material bent to have a cross-section of a second predetermined shape; and wherein the first rail piece part and the second rail piece part are fixed together such that the first predetermined shape and the second predetermined shape together form the base section and the blade section, and such that the blade section has a cross-sectional width at the guide surface that is equal to at least the sum of the first thickness and the second thickness.

It will be appreciated that the base section can be directly or indirectly mounted to the hoistway. In some examples the base section is mounted to the hoistway via additional components, e.g. a mounting bracket. In some examples multiple lengths of blade section extend from the same base section.

In some examples the blade section of the guide rail extends perpendicularly from the base section of the guide rail. In some examples the blade section extends at a set angle from the base section. In some examples the angle is between 45° and 90°. In some examples the angle is more than 90°. In some examples the angle is less than 45°.

In some examples the pair of separate rail piece parts (i.e. first and second rail piece parts) are fixed together in the blade section. In some examples, the pair of separate rail piece parts are fixed together such that the fixings do not interfere with the guide surface. In some examples the pair of separate rail piece parts are fixed together in the blade section away from the guide surface. Such a configuration ensures that the blade section does not come apart during constant use, whilst ensuring that the guiding element on a component moving along the guide rail has a smooth guide surface.

In some examples, the first rail piece part may be formed from a first sheet material, and the second rail piece part may be formed from a different second sheet material. In some examples, the first rail piece part and the second rail piece part are made from the same type of sheet material. The type of sheet material may refer to one or more non-geometric properties of the sheet material, such as e.g. its material type, material composition, surface finish, etc. . . . In some examples the first thickness may be equal to the second thickness. In some examples the first thickness is equal to the second thickness, and the pair of separate rail piece parts are formed from the same type of sheet material.

In some examples the sheet material comprises a single type of material. In some examples the sheet material comprises a plurality of types of material. In some examples the sheet material comprises a sheet metal. In some examples the sheet material is galvanized steel. In standard elevator systems elevator guide rails are made from steel components as they provide the best material properties with a smooth guiding surface and high strength and toughness. It is desirable to use sheet material which exhibits similar properties, of strength and toughness, whilst enabling the sheet material to be bent into the required predetermined shape(s). The skilled person will appreciate that typical standard guide rails may have a cross-sectional width at the guide surface that can vary from 8 mm to 16 mm, e.g. as required by industry safety standards for different types of elevator systems. In some examples, the thickness of sheet material is between 1 mm and 8 mm. In some examples, the thickness of sheet material is between 2 mm and 4 mm. In some examples the thickness of sheet material is less than or equal to 4 mm. In some examples the thickness of sheet material is less than or equal to 2 mm.

In some examples the first predetermined shape is symmetrical to the second predetermined shape (i.e. the pair of separate rail piece parts have the same, but mirrored, predetermined shapes). When the predetermined shapes are symmetrical to one another, the guide rail has a line of symmetry down the middle of the blade section. In some examples the guide rail is not symmetrical, i.e. the first predetermined shape is different to the second predetermined shape. The first and the second predetermined shapes may each comprise a base portion and a blade portion, the blade portion comprising a guide surface portion. In some examples the blade portion of each of the pair of separate rail piece parts is symmetrical and the base portions are not symmetrical. It will be appreciated that the guide rail may comprise a plurality of blade sections, wherein in each blade section, a pair of separate rail piece parts are fixed together. In some examples, the first rail piece part and/or the second rail piece part may comprise a plurality of blade portions. It will be appreciated that in this way a single guide rail may have multiple blade portions so as to allow parallel movement of multiple guiding elements along the hoistway (e.g. from multiple points on a movable component, or from a plurality of different moving components in the hoistway). In this way the cross-section of the guiderail can be adapted for various different hoistway configurations.

It will be appreciated that the predetermined shapes can be adapted for various guide rail cross-sections. In some examples the first predetermined shape and the second predetermined shape each comprise an “L” shaped cross-section; and the cross-section of the guide rail comprises a “T” shaped section formed from the pair of separate rail piece parts (i.e. first and second rail piece parts) fixed together. It will be appreciated that with these predetermined shapes the cross-section of the guide rail can be matched to standard solid “T” shaped guide rails. It may be desirable to match the cross-section of the guide rail to other known cross-sections of standard guide rails as will be appreciated by those skilled in the art.

In some examples, the cross-section width at the guide surface is equal to at least double the sum of the first thickness and the second thickness; and each of the pair of separate rail piece parts is folded back over itself to form the cross-section width at the guide surface. In some examples when the first thickness is the same as the second thickness, the cross-section width at the guide surface is equal to at least four times the thickness of sheet material. It will be appreciated that with relatively thin sheet material, the cross-section at the guide surface can be increased to more closely match the width of standard guide rails (e.g. solid steel), whilst maintaining a rigid guide surface for a guiding element of a component movable in the hoistway. The number of times the sheet material requires folding in the blade section will depend on the required width of the guide surface and the thickness of the sheet material. In some examples each of the pair of separate rail piece parts is folded back over itself a plurality of times.

In some examples the first rail piece part and/or the second rail piece part further comprises: a cut-out portion for part of the elongate length of the guide rail, the cut-out portion removing the base section and/or an adjacent part of the blade section so as to leave a continuous guide surface for the whole of the elongate length of the guide rail. In some examples the first rail piece part and/or the second rail piece part further comprises an extended base portion around the cut-out portion, connecting the base section from either side of the cut-out section in the elongate length. The cut-out portion may allow space for other components in the hoistway preventing an interference between the guide rail and the other component. The other component may be a machine. The other component may be a machine brake. The cut-out portion may remove some of or all of a base portion from the first rail piece part and/or the second rail piece part. The cut-out portion may remove some of the blade portion of the first rail piece part and/or the second rail piece part, leaving the guide surface portion. The cut-out may be symmetrical in both of the pair of separate rail piece parts, or the cut-out may be different in the first rail piece part and the second rail piece part. It will be appreciated that the cut-out portion can be tailored to the component which would otherwise interfere with the guide rail. The cut-out portion may be through the blade portion to allow another component to pass through the guide rail. It will be appreciated that a cut-out may reduce the strength of the guide rail, which may be mitigated by introducing an extended base portion around the cut-out portion. This may help keep the guide surface portion of the cut-out separate rail piece part more rigid. It will be appreciated that the cut-out portion must leave a sufficient guide surface for continuous movement of a guiding element along the guide path, and so the requirements may vary depending on the size of the guiding element and how much it is designed to interact with a guide rail.

In some examples the guide rail further comprises holes in the base section. Such holes may be used for bolting the plurality of separate rail piece parts to a supporting entity. The holes may facilitate fixing the guide rail to a mounting bracket or a hoistway wall. The holes may facilitate bolting of two guide rails together. The holes may facilitate bolting a guide rail to a fishplate designed to mount two guide rails together lengthways.

The pair of separate rail piece parts (i.e. first and second rail piece parts) may be fixed together so as to prevent movement between the pair of separate rail piece parts in any suitable manner which will be apparent to the person skilled in the art. The method of fixation will depend on the type of sheet material used. In some examples the pair of separate rail piece parts (i.e. first and second rail piece parts) are fixed together with adhesive. In some examples the pair of separate rail piece parts are welded together. Whilst such methods may be suitable, welding galvanized sheet steel may affect the material properties of the guide rail so as to reduce is strength, or increase its susceptibility to wear and rust. In some examples the pair of separate rail piece parts (i.e. first and second rail piece parts) are mechanically joined together. Mechanical joining may be advantageous to prevent damage to the guide surface, and maintain the structural integrity of the guide rail. In some examples the guide rail further comprises holes in the blade section away from the guide surface; and wherein the pair of separate rail piece parts are mechanically joined together using rivets or bolts which utilize the holes in the blade section. This may be achieved by the pair of separate rail piece parts each comprising matching holes in their respective blade portions away from their respective guide surface portions. In some examples the pair of separate rail piece parts are mechanically joined by the sheet material of the pair of separate rail piece parts having been clinched (i.e. press joined) together. It will be appreciated that by clinching or press-joining the pair of separate piece parts together a joining method can be utilized which also retains the characteristics of the surface of the sheet material (e.g. it doesn't create a surface which can rust), which can be damaged using a welding technique.

The guide rail may be suitable for various types of elevator systems. In some examples the guide rail is utilized for only part of a hoistway. In some examples the guide rail is only used for a movable component which does not utilized safety brakes on the guide rail. It will be apparent to those skilled in the art that sheet material may not have the strength and rigidity required for guide rails on which large amounts of force are exerted, without additional components to reinforce the configuration as outlined above. The suitability will depend on the required force tolerances, and the type and thickness of sheet material used. In some examples the guide rail further comprises at least one blade reinforcer, the at least one blade reinforcer comprising an additional piece of sheet material fixed between the first and second rail piece parts, at least in the blade section. It will be appreciated that the blade reinforce will act to reinforce the blade section of the guide rail, and will also increase the width of the guide surface. In some examples the blade reinforcer is made from the same sheet material as the pair of separate rail piece parts. In some examples the blade reinforcer is made from a different sheet material than the sheet material used for the pair of separate rail piece parts. In some examples the thickness of sheet material used for the blade reinforcer is the same as the first thickness and/or the second thickness. In some examples the thickness of sheet material for the blade reinforcer is different to the first thickness and the second thickness.

In some examples the guide rail further comprises at least one stabiliser formed from sheet material and configured to reinforce the base section and the blade section of the guide rail and wherein the at least one stabiliser is fixed to the outer surface of the first rail piece part and/or the second rail piece part. In some examples the guide rail further comprises a pair of stabilisers formed from sheet material and configured to reinforce the base and blade sections of the guide rail wherein the pair of stabilisers are fixed to the outer surface of each of the pair of separate rail piece parts. A stabiliser may be fixed to the outer surface of a corresponding one of the separate rail piece parts using any of the fixation methods described herein. In some examples the at least one stabiliser has an "L" shaped cross-section configured to fit to the outer surface of the predetermined "L" shape of the at least one of the pair of separate rail piece parts. In some examples the stabiliser(s) is/are made from the same sheet material as the pair of separate rail piece parts. In some examples the stabiliser(s) is/are made of a different sheet material to pair of separate rail piece parts. In some examples the thickness of sheet material used for the stabiliser(s) is/are the same as for the first thickness and/or the second thickness. In some examples the sheet material thickness of the stabiliser(s) is/are different to the first thickness and the second thickness.

In some examples the guide rail further comprises at least one base reinforcer, the at least one base reinforcer comprising an additional piece of sheet material fixed to both of the pair of separate rail piece parts, and spanning across the base section of the guide rail at least across the bottom of the blade section. The base reinforcer may span the whole of the base section, or may span part of the base section. The base reinforcer may extend further than the base portion(s) of one or both of the pair of separate rail piece parts. In some examples the base reinforcer is made from the same sheet material as the pair of separate rail piece parts. In some examples the base reinforcer is made of a different sheet material to pair of separate rail piece parts. In some examples the thickness of sheet material used for the base reinforcer is the same as the first thickness and/or the second thickness. In some examples the sheet material thickness of the base reinforcer is different to the first thickness and/the second thickness.

In some examples, the at least one blade reinforcer and/or the at least one base reinforcer, and/or the at least one stabiliser spans part of the elongate length of the guide rail. In some examples the at least one blade reinforcer and/or the at least one base reinforcer, and/or the at least one stabiliser spans the whole of the elongate length of the guide rail.

In some examples the base section is substantially flat. In some examples the first and/or the second predetermined shape further comprises a bent section such that the base section of the guide rail turns upwards at its outer edges. In some examples the first and/or the second predetermined shape further comprises a bent such that the base section of the guide rail turns downwards at its outer edges. It will be appreciated that by altering the shape of the base section the guide rail can have rigidity. It will also be appreciated that various shape cross-sections for the base section may be suitable depending on the elevator hoistway and the elevator system considerations. The base section may comprise a cross-section with additional shapes formed from bending the first and/or the second rail piece part.

It will be appreciated that the blade reinforcer, base reinforcer, stabiliser(s) and varying shape for the base section may be used in combination with one another to variably increase the material yield strength, ultimate tensile strength (UTS) and material stiffness which result from the overall geometry of the guide rail, as required by its use in an elevator system. Other features may also be added to the cross-sectional structure of the pair of separate rail piece parts as required by the particular elevator system.

According to a second aspect of the present disclosure there is provided an elevator system comprising: a hoistway; a component movable in the hoistway, comprising at least one guide element; a guide rail, mounted to a wall of the hoistway, wherein the guide rail comprises a guide rail as described above; and wherein the component is configured to move along the guide path in the hoistway.

The guide rail as described above can be designed with within the safety requirements of elevator guide rails and be used throughout an elevator hoistway. In some examples, the component movable in the hoistway will not be provided with safety brakes (e.g. on a counterweight), so the guide rails undergo less force than those designed for use with safety brakes. The guide rail of the present disclosure may also be used in combination with a component movable in the hoistway which comprises safety brakes (e.g. safeties). The cross-section of the guide rail can be tailored to provide the required gripping surface for the safety brake. In some examples the guide rail will require reinforcing (e.g. from a blade reinforcer and/or a base reinforcer, and/or one or more stabilisers) to safely withstand the repeated use of safety brakes. The guide rail of the present disclosure may be more suitable for the whole of the hoistway in low speed elevator systems, where the forces exerted on the guide rail are reduced. The integral properties of the guide rail will depend on the material of sheet material used.

In some examples the guide rail comprises a combination of the guide rail as described above with a standard elevator guide rail (e.g. a solid "T" shaped guide rail). In some examples the guide rail of the present disclosure is used at the bottom of the hoistway. In some examples the guide rail of the present disclosure is used in the middle of the hoistway.

According to a third aspect of the present disclosure there is provided an elevator system comprising: a hoistway; a component movable in the hoistway, comprising at least one guide element; a combined guide rail mounted to a wall of the hoistway, the combined guide rail comprising a standard guide rail and the guide rail as described above; wherein the standard guide rail and the guide rail of any preceding claim have substantially similar guide surfaces to smoothly guide the at least one guide element; wherein the standard guide rail is installed in a lower section of the hoistway, and the guide rail as described above is installed above the standard guide rail, and wherein standard guide rail and the guide rail as described above are arranged next to one another along the hoistway to form a continuous guide path along the guide surfaces; and wherein the component is configured to move along the guide path in the hoistway.

It will be appreciated that by combining a section of guide rail of the present disclosure with a standard guide rail the guide rail of the present disclosure can replace a section of standard guide rail where otherwise interference between a hoistway component and the guide rail would occur. This may be preferable in spaces where the guide rail only interacts with a guiding element and not with a safety brake. In some examples the guide rail of the present disclosure replaces the very top section of guide rail in the hoistway. It will be appreciated that whilst standard guide rails come in specific lengths (e.g. 5 m, 10 m) the guide rail of the present disclosure may easily be adapted for different lengths, so may replace a shorter space in the hoistway than would be suitable for a length of standard guide rail. In compact elevator systems interference between different elevator components can be a significant problem, especially at the top of the hoistway. Cutting out sections from standard guide rails to prevent interference creates a number of problems, which may be solved by instead utilizing a guide rail of the present disclosure. The guide rail of the present disclosure can efficiently, and with reduced costs, be designed to prevent interference by including a cut-out portion, whilst retaining the integrity of the section of guide rail especially in areas where safety brakes will not interact, without the need for additional parts to reinforce the area.

The guide rail may be mounted directly or indirectly to the hoistway (e.g. directly to the hoistway wall, or via mounting brackets). In some examples the standard guide rail is a solid steel “T” shaped rail.

In some examples the two types of guide rail are mounted separately in the hoistway, aligned lengthways to form the continuous guide path. In some examples the two types of guide rail are connected to each other (e.g. by fishplates). In some examples the two types of guide rail may have a small gap between them vertically. The small gap must allow for the smooth movement of the guiding element, i.e. the small gap must be small from the perspective of the guiding element (e.g. 1 mm).

It will be appreciated that the cross-section of the guide rail of the present disclosure can be adapted in various ways as described above so as to closely match the cross-section of the standard guide rail it is used in combination with. It may not be necessary to match all of the dimensions of the standard guide rail so long as the guide surfaces are effectively continuous to the guiding element creating a continuous guide path in the hoistway. It will be appreciated that the two types of guide rail will have substantially similar guide surfaces from the perspective of a guiding element which may interact with the guide rail. The simple manner in which each of the separate rail piece parts are cut and then bent into shape allows for more variations in cross-sectional shape than a solid metal guide rail which needs to be cast into shape.

In any of the elevator systems herein described, in some examples the component movable in the hoistway is an elevator car. In some examples the elevator car has a plurality of guiding elements displaced vertically along the elevator car. In some examples the component movable in the hoistway is a counterweight. In some examples the counterweight has a plurality of guiding elements displaced vertically along the counterweight. In some examples an upper guiding element interacts with a guide rail of the present disclosure and the remaining guiding elements interact with a standard guide rail. In some examples the guiding element is a guide shoe.

According to a fourth aspect of the present disclosure there is provided a method for manufacturing a guide rail for an elevator system; the guide rail having an elongate length with a cross-section perpendicular to the elongate length; the cross-section comprising a base section and a blade section, the blade section extending from the base section; the method comprising: providing a pair of separate rail piece, the pair of separate rail piece parts comprising a first rail piece part and a second rail piece part; the first rail piece part being formed from a first thickness of sheet material bent to have a cross-section of a first predetermined shape, and the second rail piece part being formed from a second thickness of sheet material bent to have a cross-section of a second predetermined shape; and fixing the pair of separate rail piece parts together, such that the first predetermined shape and the second predetermined shape together form the base section and the blade section of the guide rail, and such that the blade section has a cross-sectional width at the guide surface that is equal to at least the sum of the first thickness and the second thickness.

In some examples, the method further comprises fixing the pair of separate rail piece parts together in the blade section. In some examples, fixing the pair of separate rail piece parts together comprises clinching together the first and the second sheet material. In some examples the clinching together is a non-cutting technique. It will be appreciated that clinching is a cold forming process which involves joining a plurality of sheet materials together by drawing the plurality of sheet materials into a die (which may sit above an anvil) by a punch, to form the joint. Clinching may be advantageous due to improved fatigue properties and the easy repeatability and automation of the joining technique.

In some examples, the first sheet material and the second sheet material are different types of sheet material. In some examples the first sheet material and the second sheet material are the same type of sheet material. In some examples the first thickness is the same as the second thickness. In some examples the first thickness is different to the second thickness. In some examples the first predetermined shape and the second predetermined shape are symmetrical (i.e. the pair of separate rail piece parts are symmetric to each other). In some examples the first predetermined shape and the second predetermined shape are asymmetrical.

In some examples, the method for manufacturing a guide rail may further comprise: cutting the first rail piece part of the elongate length from the first thickness of sheet material; cutting the second rail piece part of the elongate length from the second thickness of sheet material; bending the first rail piece part along at least one fold line parallel to the elongate length to create the cross-section of the first predetermined shape; and bending the second rail piece part along at least one fold line parallel to the elongate length to create the cross-section of the second predetermined shape. In some examples the cutting step occurs before the bending step. In some examples the bending step occurs before the cutting step. In some examples the fixing step occurs before the cutting step.

In some examples the method may comprise: bending a thickness of sheet material along at least one fold line to create a folded part with a cross-section of a predetermined shape; and cutting the pair of separate rail piece parts from the folded part, each of the pair of separate rail piece parts having the elongate length.

In some examples, the first thickness and the second thickness are the same, and/or the pair of separate rail piece parts can be made from the same material, and/or the first predetermined shape and the second predetermined shape are symmetrical (e.g. with mirror symmetry). It will be appreciated that if the predetermined shapes (i.e. the cross-sections of the pair of separate rail piece parts) are symmetrical, during manufacture the pair of separate rail piece parts may be formed from a single piece of sheet material, and a single length may be subsequently cut to form the pair of separate piece parts (i.e. the first rail piece part may be the same as the second rail piece part until they are arranged to be fixed together). In some examples a single length of a sheet material is cut into more than two pieces to form multiple individual lengths of separate rail piece parts.

It will be appreciated that the separate rail piece parts can be fabricated separately, and then fixed together either during manufacture of a length of guide rail, or at the site of an elevator system.

It will be appreciated by the skilled person that the order of the method steps disclosed herein are by way of example only, and the steps of the method may equally be performed in any other reasonable order as will be dictated by a production arrangement, and the specification of the guide rail.

In some examples the sheet material may be first cut to a predetermined width, then the sheet material may be bent to create a cross-section of the predetermined shape, and then the first and second rail piece parts may be cut to have the elongate length. In some examples the sheet material is produced with the predetermined width. In some examples cutting further compromises cutting a cut-out portion and/or holes. In some examples the cutting of the cut-out portion and/or holes may be performed prior to the bending step, and the cutting of the rail piece parts to have the elongate length may then occur after the bending step. In some examples all required cutting of the rail piece parts may be performed prior to the bending step. In some examples the guide rail may be cut to have the elongate length after the pair of separate rail piece parts (i.e. first and second rail piece parts) have been fixed together.

It will be appreciated that the at least one fold line allows each rail piece part to be bent into the predetermined shape. In some examples the first and second rail piece parts are folded along a first fold line between a base portion and a blade portion. In some examples the bend along the first fold line is substantially 90°. In some examples the rail piece parts are folded along a second fold line at substantially 180° to form the width at the guide surface.

In some examples the cutting further comprises cutting at least one blade reinforcer and/or at least one base reinforcer, and/or at least one stabiliser. In some examples the method further comprises fixing at least one blade reinforcer and/or at least one base reinforcer, and/or at least one stabiliser to the first rail piece part and/or the second rail piece part.

It will be appreciated that the disclosure above with reference to a guide rail is equally applicable to the method for manufacturing a guide rail. It will also be appreciated that the labels "first" and "second" are made to aid with understanding only, and there is no inherent technical difference between the first and second rail piece parts. Both the first and second piece parts may be generally referred to together as the pair of separate rail piece parts, or individually as one of the pair of separate rail piece parts.

Generally, herein there is disclosed a flexible solution for a guide rail which can be quickly, easily and cheaply adapted to a variety of different elevator systems.

DRAWING DESCRIPTION

Certain preferred examples of this disclosure will now be described, by way of example only, with reference to the accompanying drawings, in which.

DETAILED DESCRIPTION

Figure 1:
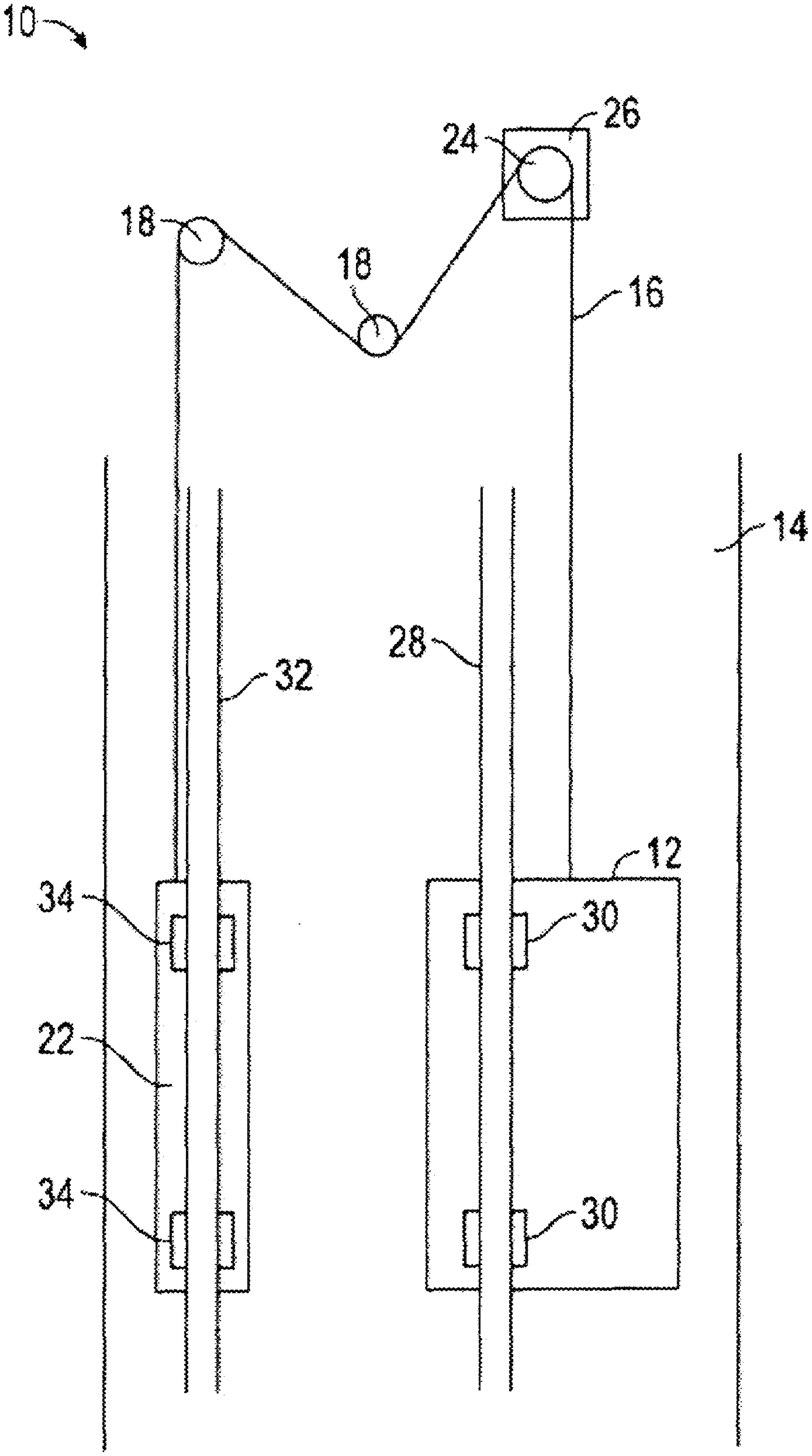
FIG. 1 is a schematic view of an elevator system.

FIG. 1 is a schematic view of an example elevator system 10. The sections and components of the elevator system 10 not necessary to the understanding of the present disclosure are not shown. The elevator system 10 includes an elevator car 12 and counterweight 22 movable in an hoistway 14. The elevator car 12 is suspended in the hoistway 14 by means of one or more tension members 16, for example a rope or a belt. The tension members 16 interact with one or more sheaves 18 which can be routed around various components of the elevator system 10. One of the sheaves may be a traction sheave 24 actuated by a machine 26 to raise and lower the elevator car 12 in the hoistway 14. The tension members 16 are also connected to the counterweight 22, which is used to provide balance to the elevator system 10 and minimise the difference in tension between the tension members 16 on either side of the traction sheave 24. Various roping arrangements will be known to those skilled in the art, including a 1:1 and 2:1 roping ratio.

To guide the movement of the elevator car 12 and the counterweight 22 in the hoistway 14, elevator car guide rails 28 and counterweight guide rails 32 are secured in the hoistway 14. The guide rails 28, 32 may be mounted directly onto the hoistway 14 wall, or may be mounted indirectly to the hoistway 14, for example via additional brackets (not shown). The guide rails 28, 32 define a guide path for the movement of the elevator car 12 and counterweight 22 respectively. The elevator car 12 and counterweight 22 include one or more guiding elements, for example elevator guide shoes 30 and counterweight guide shoes 34 which move along a guide surface (not shown) on the guide rails 28, 32. Other components may also interact with the guide rails 28, 32, which are not here shown, for example safety brakes which are arranged to halt the movement of the elevator car 12.

Whilst an example elevator system 10 has been described above, the skilled person will understand that this is by means of example only, and that the invention as disclosed herein may be suitable for various types of elevator systems.

It will be appreciated that, whilst a roped elevator with a counterweight is described herein, the examples of guide rails described herein will work equally well with a ropeless elevator system e.g. hydraulic, pinched wheel propulsion systems, systems with linear motors, or any other desired means of propelling an elevator car.

Figure 2:
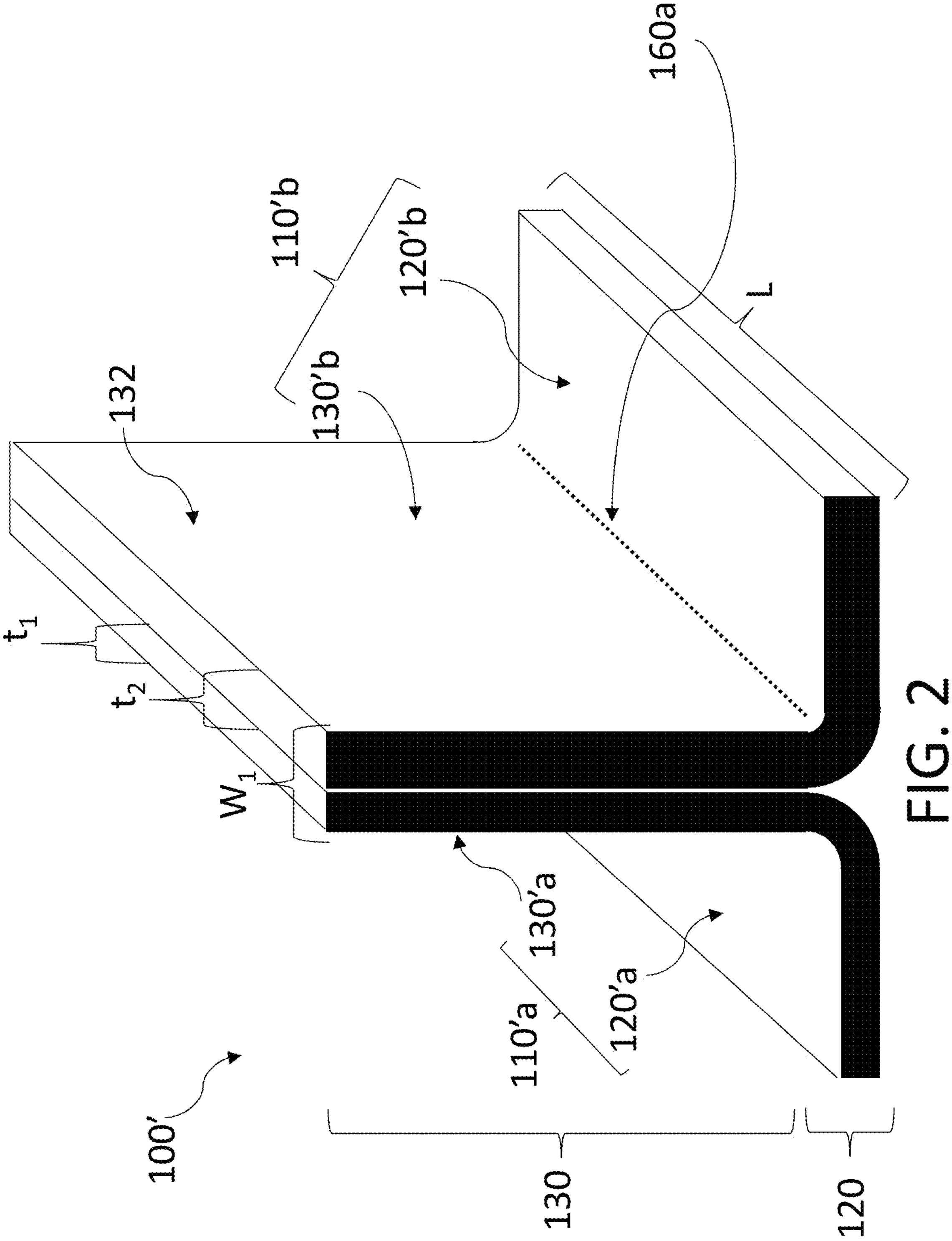
FIG. 2 shows a perspective view of an elevator guide rail according to an example of the present disclosure.

FIG. 2 shows an example elevator guide rail 100', made from a first rail piece part 110'*a* and a second rail piece part 110'*b* fixed together. The first rail piece part 110'*a* and the second rail piece part 110'*b* are collectively referred to as a pair of separate rail piece parts 110'*a*, 110'*b*. The guide rail 100' has an elongate length L, and a cross-section perpendicular to the elongate length L. In cross-section, the guide rail 100' has a base section 120 and a blade section 130 protruding from the base section 120, and the blade section 130 has a guide surface 132 designed to interact with a guiding element (not shown) as described above with reference to FIG. 1. Each of the pair of separate rail piece parts 100'*a*, 100'*b*, is made from a set thickness of sheet material which is cut so as to have the elongate length L, and then bent along a first fold line 160*a* (as showed by the dotted line) into a three-dimensional shape with cross-section of a predetermined shape. For example, the first rail piece part 110'*a* has a first thickness $t_1$ and the second rail piece part has a second thickness $t_2$. In this example, each of the pair of separate rail piece parts 110'*a*, 110'*b* has an "L" shaped cross-section, such that each of the pair of separate rail piece parts 110'*a*, 110'*b* has a base portion 120'*a*, 120'*b* and a blade portion 130'*a*, 130'*b*. The pair of separate rail piece parts 110*a*, 110*b* are fixed together so the blade section 130 is formed from two layers of sheet material fixed together, giving the blade section 130 a cross-sectional width $W_1$ equaling the sum of the first thickness $t_1$ and the second thickness $t_2$. The guide rail 100' therefore has a "T" shaped cross-section formed from the "L" shaped pair of separate rail piece parts 110'*a*, 110'*b* fixed together.

It will be appreciated by the skilled person that the elongate length L of the guide rail 100' can be made to any suitable length, and standard elevator guide rail lengths are usually made to 5 m or 10 m. It will also be appreciated that the exact shape of the base section 120 of the guide rail 100' can be adapted for different types of elevator system, whether the guide rails require attaching directly to a hoistway wall, or indirectly to a hoistway wall via a number of brackets, or attaching to another length of guide rail so multiple guide rails sit side by side in the elevator hoistway. The width $W_1$ of the cross-section at the guide surface 132 must correspond to the requirements of any guiding element (e.g. an elevator car guide shoe). The whole of the blade section 130 may have the guide surface 132, or only part of the blade section 130 may have the guide surface 132.

Whilst the labels "first" and "second" have been used to distinguish each of the pair of separate rail piece parts, it will be appreciated that these labels are arbitrary in nature, and are used only to aid with the understanding about the form of the pair of rail piece parts. In some of the examples described herein the first and second rail piece parts have different properties, however in some other examples, the pair of separate rail piece parts have different properties (i.e. predetermined shapes, thicknesses, etc.)

Figures 3A, 3B, 3C:
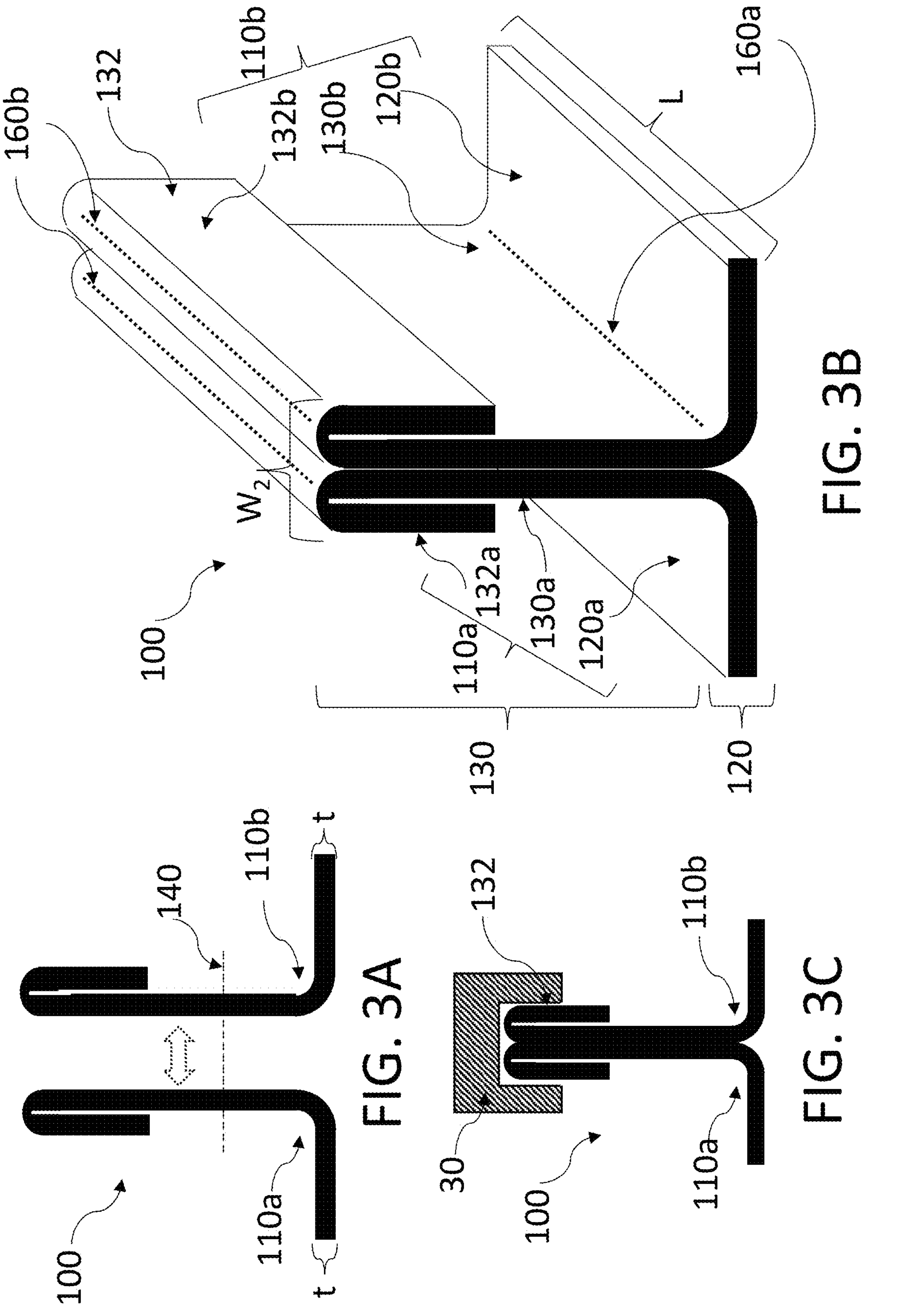
FIG. 3A shows a cross-sectional view of a pair of separate rail piece parts fixed together to from a guide rail according to an example of the present disclosure.
FIG. 3B shows a perspective view of the guide rail of FIG. 3A.
FIG. 3C shows the guide rail of FIG. 3A and FIG. 3B in combination with a guiding element.

FIG. 3A, FIG. 3B and FIG. 3C show another example of an elevator guide rail 100. The guide rail 100 has the same main components as the embodiment described above with reference to FIG. 2. In this example, the pair of separate rail piece parts 110*a*, 110*b* (i.e. a first rail piece part 110*a*, and a second rail piece part 110*b*) are shown to have the same thickness t of sheet material, and are fixed together (as shown schematically by the dashed line 140) in the blade section 130 as shown in FIG. 3A, the double arrow indicating the pair of separate rail piece parts 110*a*, 110*b* being brought together during a fixing process. Each of the pair of separate rail piece parts 110*a*, 110*b* has a base portion 120*a*, 120*b*, a blade portion 130*a*, 130*b*, and a guide surface portion 132*a*, 132*b*. In this example the ends of each of the pair of separate rail piece parts 110*a*, 110*b* are bent back over themselves at the end of the blade section 130 (i.e. along a second fold line 160*b*) to form the guide surface portion 132*a*, 132*b*, and therefore a wider section for the guide surface 132. The cross-sectional width $W_2$ at the guide surface 132 (i.e. from one guide section portion 132*a* to the other guide section portion 132*b*) is therefore four times the thickness t of sheet material. A guide shoe 30 can then sit over the guide rail 100 at the guiding surface 132 as shown in FIG. 3C.

Figures 4A, 4B, 4C:
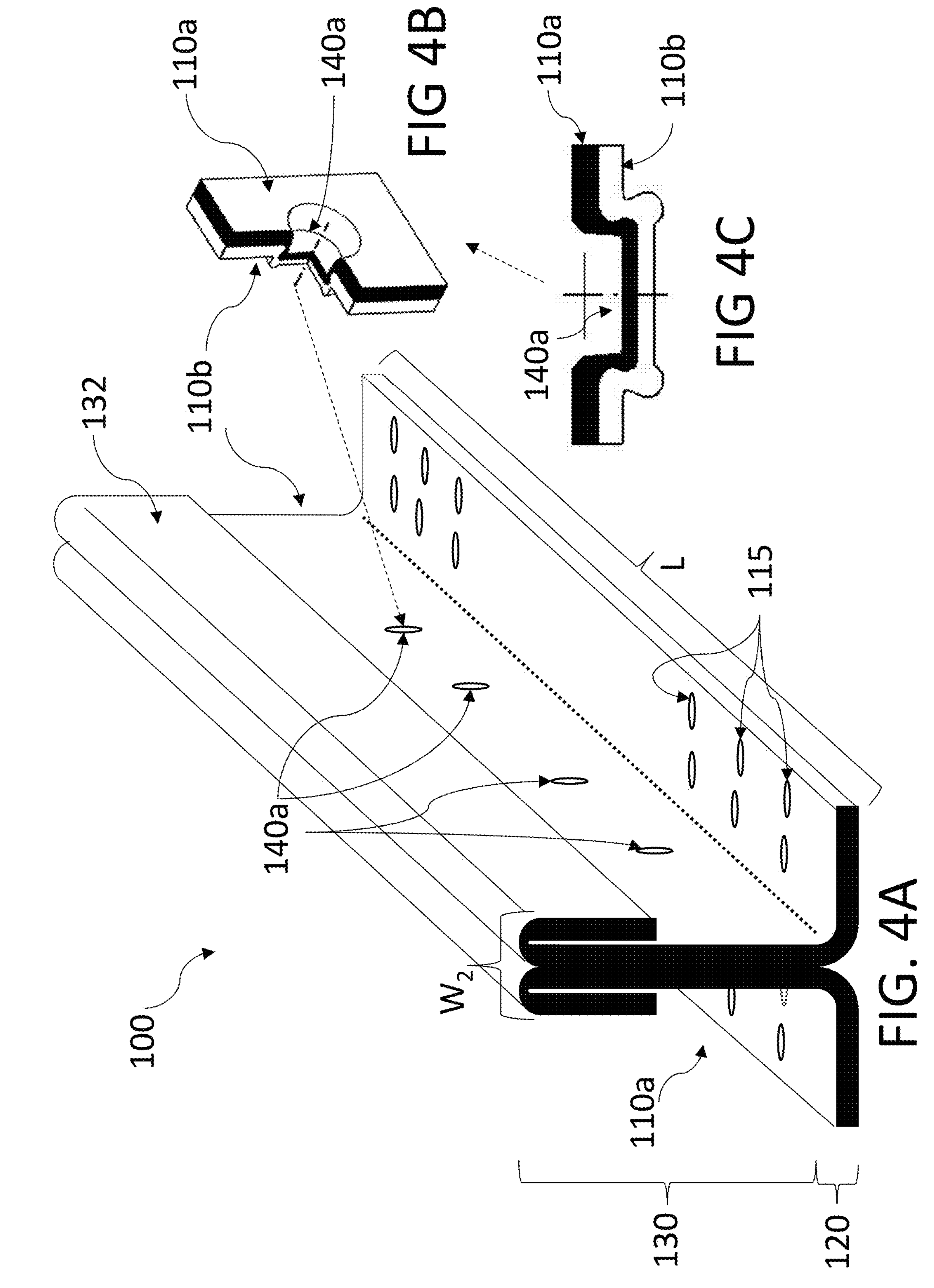
FIG. 4A shows a perspective view of an elevator guide rail according to a further example of the present disclosure.
FIG. 4B and FIG. 4C show two zoomed in perspectives of the fixing of pair of separate rail piece parts by clinching to form the guide rail of FIG. 4A.

FIG. 4A, FIG. 4B, and FIG. 4C show a similar example guide rail 100 to that shown in FIGS. 3A-3C, and show how the pair of separate rail piece parts 110*a*, 110*b* can be fixed together, and how the guide rail 100 may be fixed to the hoistway (not shown). The guide rail 100 is shown with holes 115 in the base section 120 which can be used to fix the guide rail 100 in an elevator hoistway as discussed above. In the blade section 130 fixing points 140*a* are shown, and these fixing points 140*a* are in the blade section 130 away from the guide surface 132 so as not to interfere with the guiding element of the component moving along the guide path (e.g. a guide shoe on an elevator car as discussed above). In this example the pair of separate rail piece parts 110*a*, 110*b* are fixed together by clinching (i.e. press-joining) the two sheets of material together as shown in FIG. 4B and FIG. 4C. It will be appreciated that whilst this example shows the pair of separate rail piece parts 110*a*, 110*b* fixed together by clinching, other methods of fixation are also suitable so long as the pair of separate rail piece parts 110*a*, 110*b* are firmly fixed together in an appropriate manner. In some examples the guide rail is formed from welding the pair of separate rail piece parts 110*a*, 110*b* together. In some further examples, the guide rail 100 is formed by using holes in similar locations to the clinching through which the pair of separate rail piece parts 110*a*, 110*b* can be bolted or riveted together.

It will be appreciated that the holes 115 and/or fixing points 140*a* shown in FIG. 4A can be applied to any of the example guide rails described herein, although for clarity, some of the FIGS. do not explicitly show them. Equally, various other fixation methods may be available to the skilled person which means holes and/or fixing points are not required in some applications of the examples herein, for example using spot welding.

In some elevator systems, components in the hoistway can interfere with the placement of the guide rails. An example of this can be seen in the schematic diagram of an elevator system 10 shown in FIG. 5, which will be appreciated as not showing any of the components to scale, but merely showing a representation of the outlined problem. A movable component 12 (e.g. an elevator car) with guiding elements 30 (e.g. guide shoes) is shown relative to a combined guide rail 2000. The combined guide rail 2000 comprises a section of guide rail 1000 of the present disclosure, along with a section of a standard guide rail 28. In this example of an elevator system having a very compact layout, the machine 26 is located such that it interferes with the guide rail 1000. In this example the base section 120 and lower part of the blade section 130 need to be removed (as shown by the dashed lines) to provide space for the machine 26, whilst leaving a continuous guide surface 132 for the guiding element 30 of the elevator car 12 to move along a guide path. The interference issue between the machine 26 and the guide rail 1000 is only at the very top of the hoistway (not shown). It may then be possible to use a standard guide rail 28 for the lower section of the hoistway, and connect it to a section of the guide rail 1000 disclosed herein for the top section of the hoistway, which can be adapted to prevent interference as described below with reference to FIGS. 6-8.

It will be appreciated that whilst in this example a machine 26 located at the top of an hoistway is interfering with the guide rail 1000, other elevator system components in other locations in the hoistway may also have interference problems with the guide rail in a hoistway. In these examples a section of adapted guide rail 1000 may be used, or the whole of the guide rail in the hoistway may be a guide rail as disclosed herein.

Figure 5:
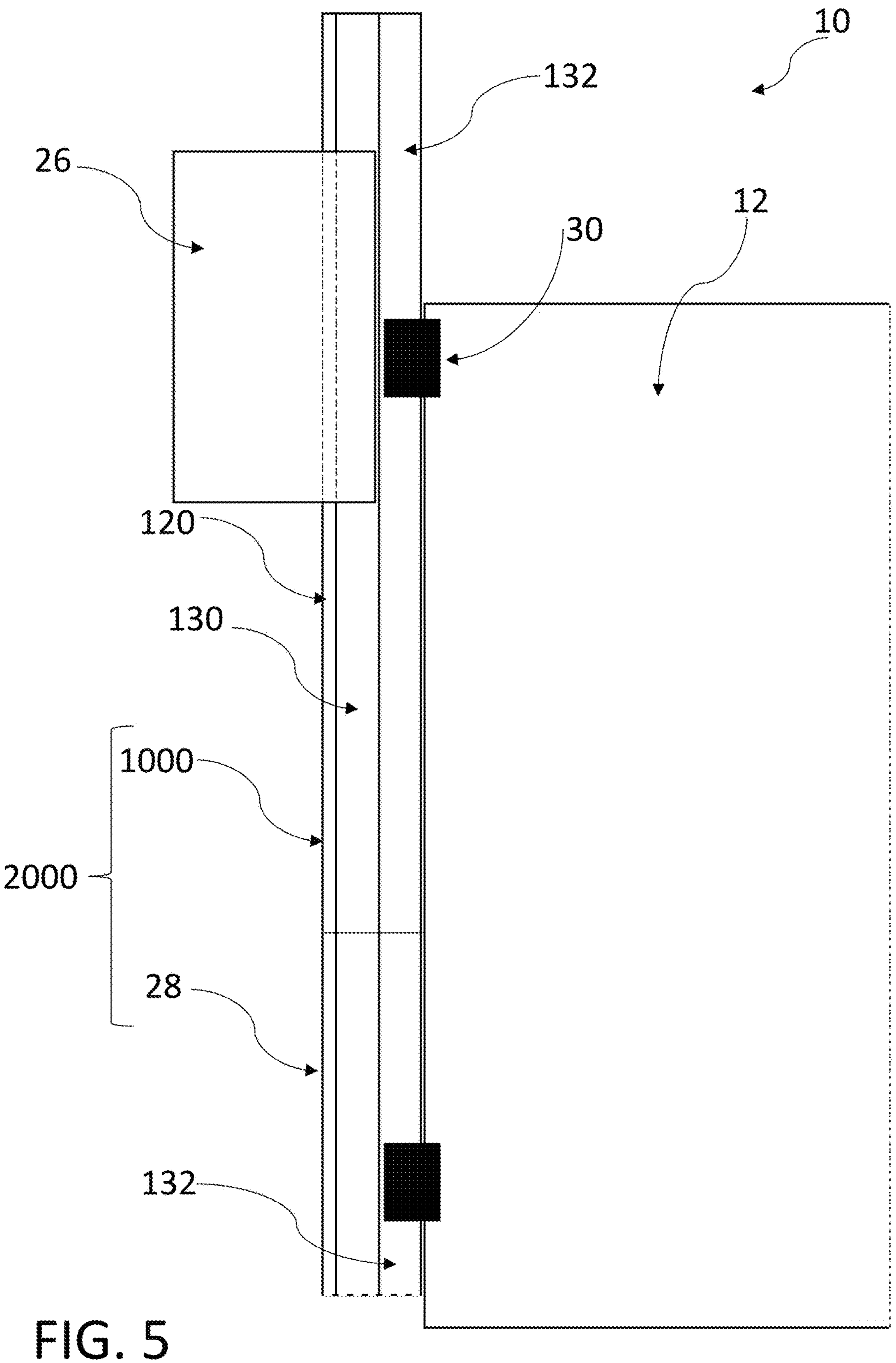
FIG. 5 shows a schematic view of an example elevator system according to the present disclosure.
Figure 6:
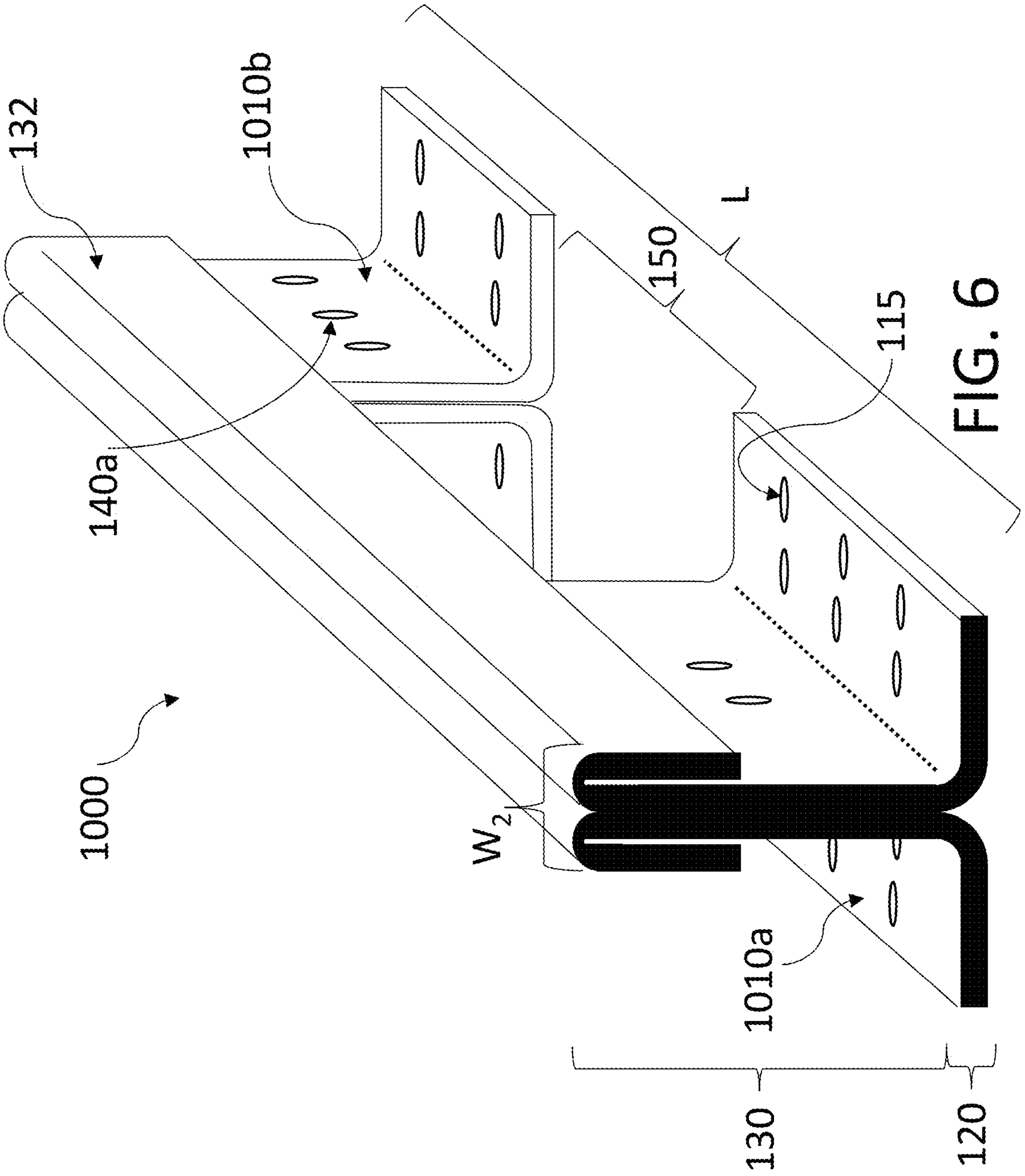
FIG. 6 shows a perspective view of an elevator guide rail with a cut-out portion according to a further example of the present disclosure.

FIG. 6 shows the guide rail 1000 with all the features of the previously described guide rail 100 described with reference to FIGS. 3-4, with a pair of separate rail piece parts **1010*a*, 1010*b*. In the guide rail 1000, the pair of separate rail piece parts 1010*a*, 1010*b* additionally have a cut-out portion 150 to prevent interference with an elevator component as described above with reference to FIG. 5. The dashed lines indicated in FIG. 5 represent the area of interference is prevented by utilizing a cut-out portion 150. The cut-out portion 150 is for the part of the elongate length L which would otherwise have interfered with a component in the hoistway, and in this example removes the base section 120 and lower part of the blade section 130 for that part of the elongate length L, leaving a continuous guide surface 132. Whist this example is shown removing identical (symmetric) sections from both of the pair of separate rail piece parts 1010*a*, 1010*b* it may only be necessary to remove some of one of the pair of separate rail piece parts 1010*a*, 1010*b*. In some examples the interference may only require a cut-out portion for part of the base section 120, and/or the blade section 130**.

Figure 7:
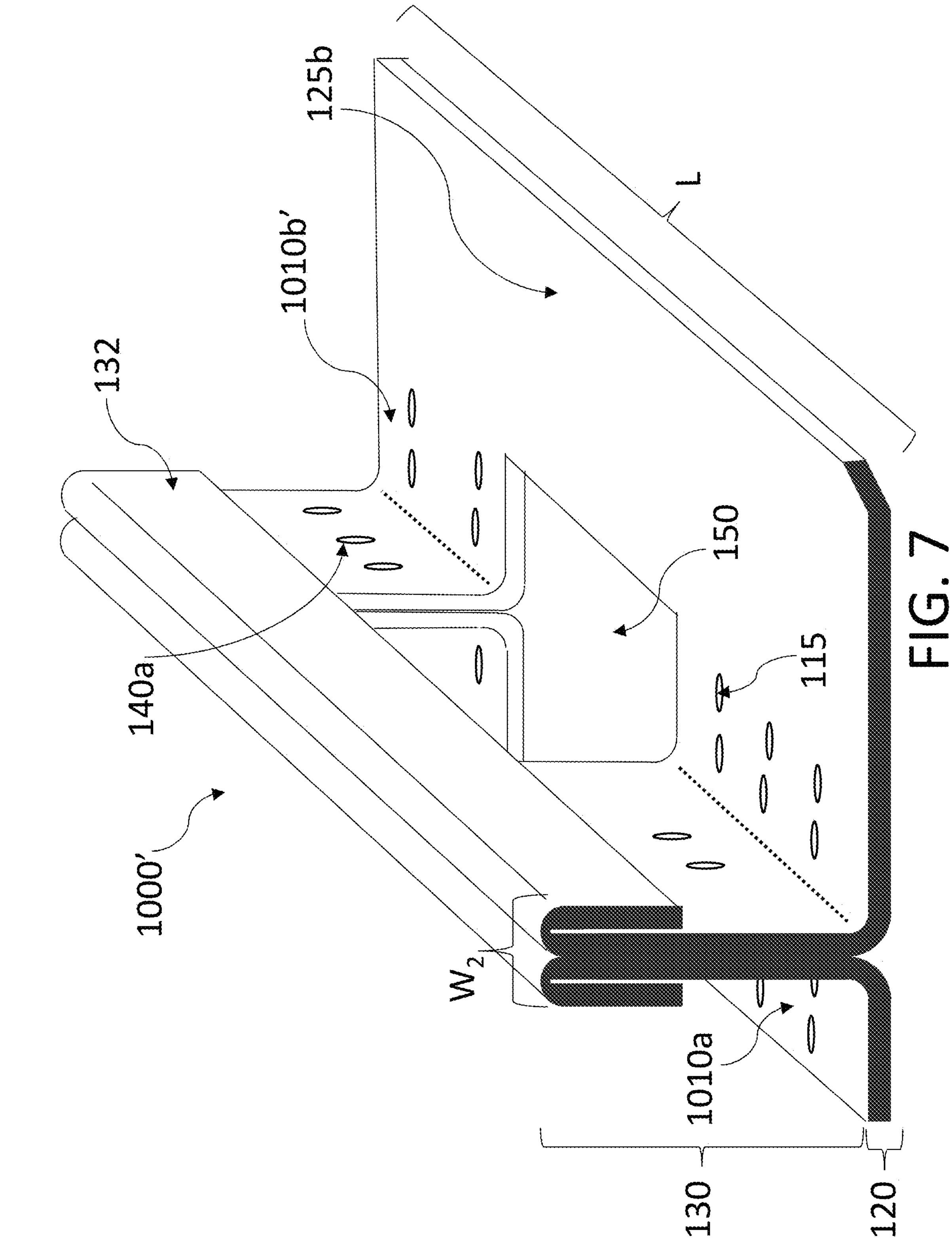
FIG. 7 shows a first perspective view of an elevator guide rail with a cut-out portion and extended base portion according to a further example of the present disclosure.
Figure 8:
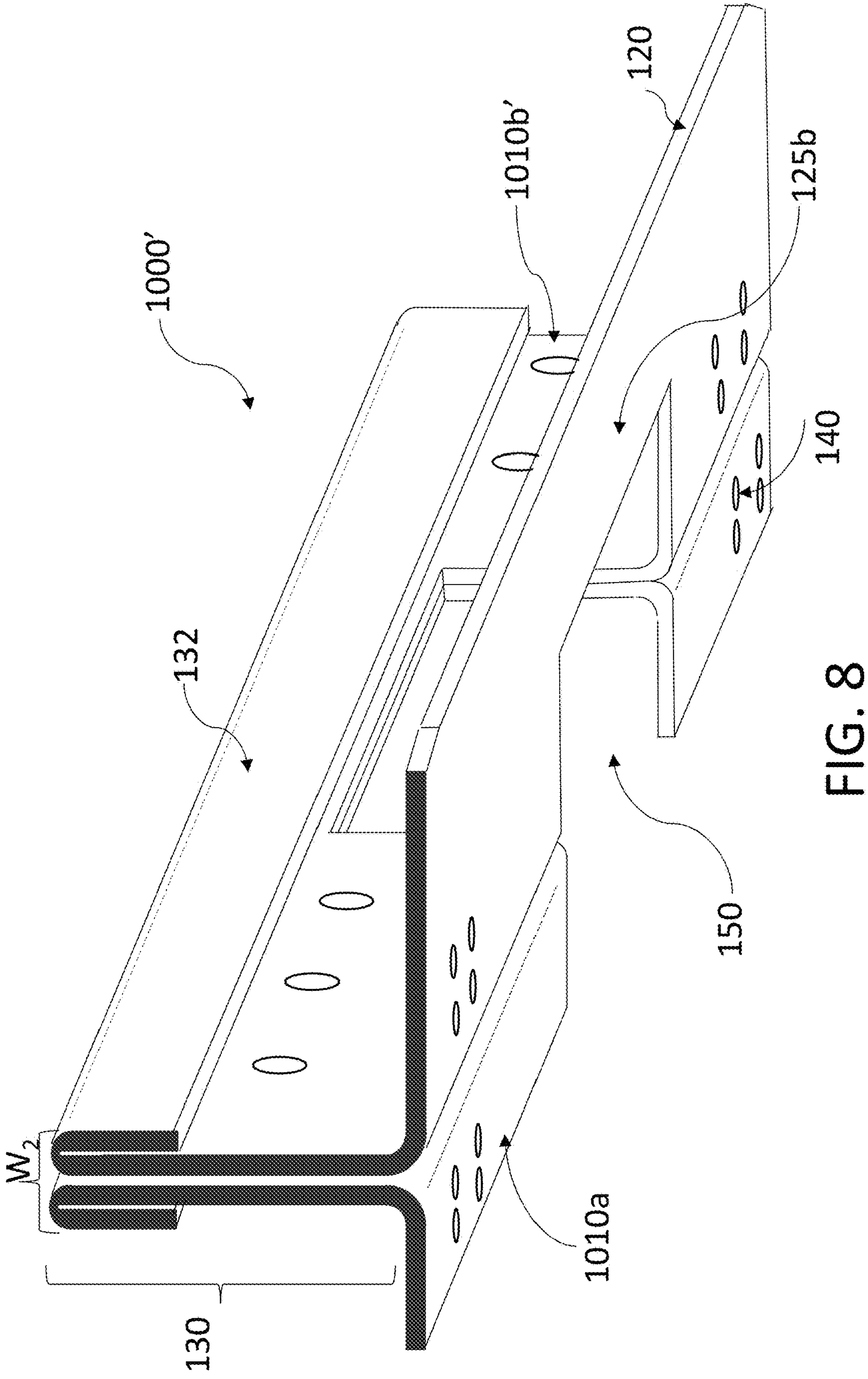
FIG. 8 shows a second perspective view of the elevator guide rail of FIG. 7.

FIG. 7 and FIG. 8 show a further example of a guide rail 1000' with cut-out portion 150 from two different perspectives. The cut-out portion 150 is the same as the cut-out portion 150 shown in FIG. 6, however in this example one of the pair of separate rail piece parts, the second rail piece part **1010*b*', has an extended base portion 125*b* around the cut-out portion 150, connecting the base section 120 from either side of the cut-out portion 150 in the elongate length L. It will therefore be appreciated that in this example, the first rail piece part 1010*a* has a first predetermined shape, and the second rail piece part 1010*b*' has a second predetermined shape. The extended base portion 125*b* may be only on one of the pair of separate rail piece parts e.g. the second rail piece part 1010*b*' as shown in FIG. 7 and FIG. 8**, however in some other examples (not shown) both of the pair of separate rail piece parts may have extended base portions (and the pair of separate rail piece parts may have the same, but mirrored, predetermined shapes).

It will be appreciated that whilst FIG. 6-FIG. 8 are shown with the folded back guide surface portions 132 in the blade section 130 so the guide surface 132 has a width $W_2$ equaling four times the thickness of the sheet material, the cut-out portion 150 may be equally applied to any other configuration described herein (e.g. the example of FIG. 2), so long as the guide surface 132 remains continuous to form a continuous guide path (e.g. for a guiding element to move along).

Other cross-sectional profiles for a guide rail may also be suitable as shown in FIG. 9A-FIG. 9D. It will be appreciated that the cross-sections shown in these figures will have an elongate length in the same way as previously described with reference to FIG. 2-FIG. 8. Any of these profiles may also be suitable for including a cut-out portion, and/or may include an extended base portion on one or both sides, as described with reference to FIG. 6-FIG. 8. The various parts are fixed together at least where indicated by the dashed lines 140, where the double arrows represent any parts being brought together during a fixing step during manufacture as described below.

Figures 9A, 9B, 9C, 9D:
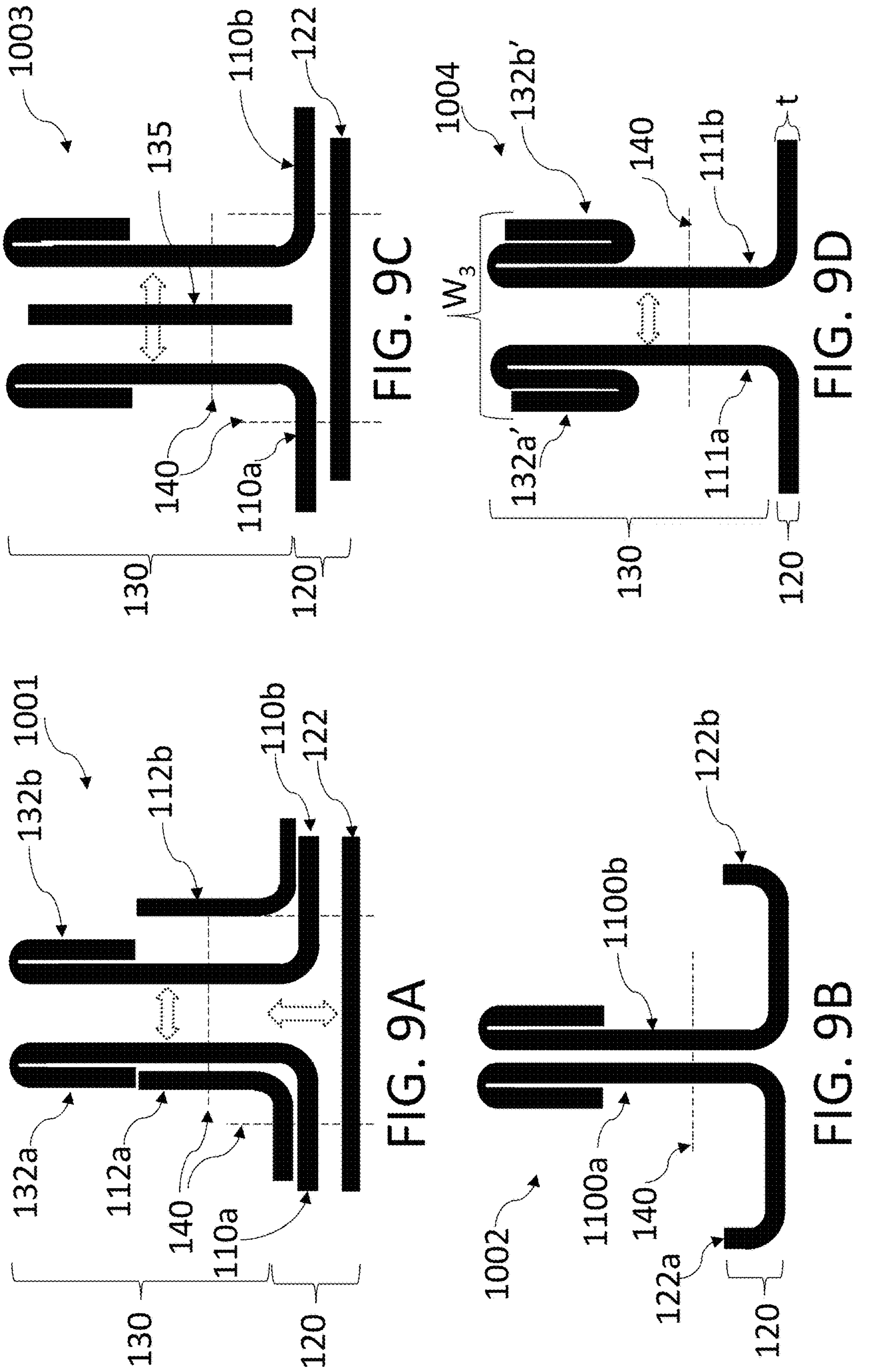
FIG. 9A-9D show cross-sectional views of additional examples of a guide rail according to the present disclosure.

FIG. 9A shows a guide rail 1001 cross section with additional pieces of sheet material **112*a*, 112*b*, 122 added to the basic structure of a pair of separate rail piece parts 110*a*, 110*b*. In this example the guide rail 1001 has a pair of "L" shaped stabilisers 112*a*, 112*b* fixed to the outer surface of the pair of separate rail piece parts 110*a*, 110*b*, in the blade section 130 and the base section 120, and sitting below the bent over guide surface portions 132*a*, 132*b* on the blade section 130. In this example the guide rail 1001 also has a base reinforcer 122 made from an additional flat piece of a sheet material fixed to both of the pair of separate rail piece parts 110*a*, 110*b*, and spanning the base section 120 across the bottom of the blade section 130**.

FIG. 9B shows a guide rail 1002 cross section with pair of separate rail piece parts **1100*a*, 1100*b* fixed together as shown by the dashed line 140. The cross-sectional shape of each of the pair of separate rail piece parts 1100*a*, 1100*b* has an upturning portion 122*a*, 122*b* as the end of each of the base portions, such that the base section 120 of the guide rail 1002 turns upwards at its outer edges. This can improve rigidity of the base section 120**.

FIG. 9C shows a guide rail 1003 cross section with additional pieces of sheet material added to the basic structure of a pair of separate rail piece parts **110*a*, 110*b*. In this example the guide rail 1003 has a blade reinforcer 135, and a base reinforcer 122 (as also shown in FIG. 9A). The various parts are fixed together at least where indicated by the dashed lines 140. The blade reinforcer 135 is an additional flat piece of sheet material fixed between the blade portions of the pair of separate rail piece parts 110*a*, 110*b*. In this example the blade reinforcer 135 extends for the whole of the height of the blade section 130, however it will be appreciated that it may only extend for part of the height of the blade section 130 (e.g. just between the guide surface 132 at the top of the blade section 130). The base reinforcer 122 spans both base portions of the pair of separate rail piece parts 110*a*, 110*b*. The base reinforcer 122 may extend for the whole of the base section 120 or may only extend across part of the base section 120**.

FIG. 9D shows a guide rail 1004 with an alternative cross section at the guide surface (i.e. the end of the blade section 130) so that the guide surface has an increased width $W_3$ of six times the thickness t of the sheet material. Whilst in FIG. 3-FIG. 9C the guide surface portions **132*a*, 132*b* are made by folding the sheet material back over itself once, in this example the sheet material is folded again so in the guide surface portions 132*a*', 132*b*' each of the pair of separate rail piece parts 111*a*, 111*b* folds back over itself twice. The pair of separate rail piece parts 111_a_, 111_b_ are then fixed together as described above and as indicated by the dashed line 140**.

It will be appreciated that whilst each example above has been described separately, any of the various configurations may be combined, or selectively introduced. For example, only one additional piece of sheet material may be used (e.g. one of the pair of stabilisers, or only a base reinforcer, or only a blade reinforcer), or any combination of the examples (e.g. a single stabiliser and a blade reinforcer, or a bent base with a base reinforcer, etc.).

Figure 10:
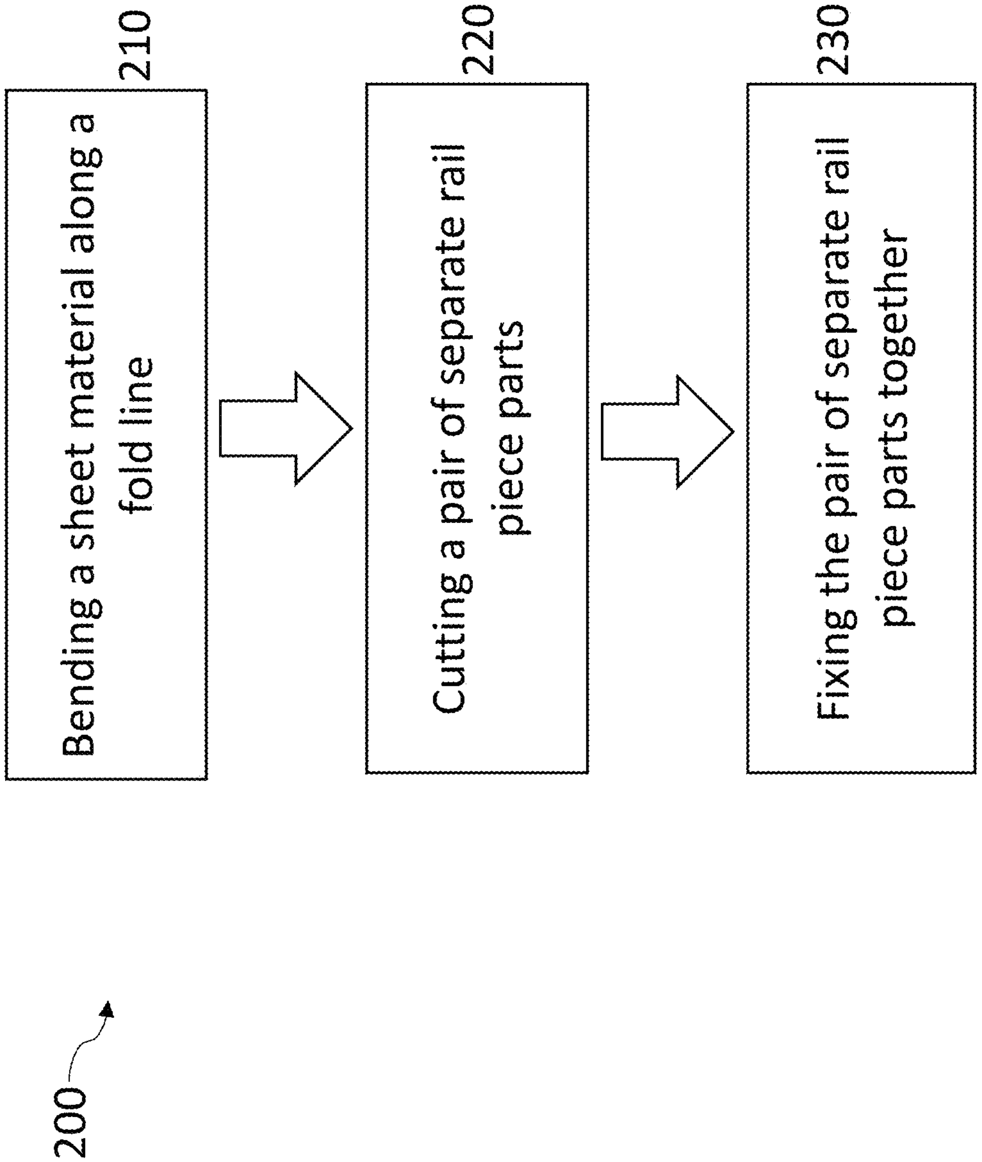
FIG. 10 shows a flow-chart representing the method for manufacturing a guide rail according to the present disclosure.

FIG. 10 is a flowchart outlining a method 200 for manufacturing an elevator guide rail as described in some of the examples described herein. It will be appreciated by the following description, that this example method is most suited for the example where the first rail piece part and the second rail piece part are formed from the same thickness of a single type of sheet material. In step 210 a sheet material is bent lengthways (i.e. along a fold line) so as to create a folded part with cross-section of a predetermined shape, for example by bending into any of the shapes as outlined above, i.e. by bending each of the pair of separate rail piece parts between the base portion and the blade portion, and to form the guide surface portion. Bending may be performed using any method as will be appreciated by those skilled in the art, for example bending the sheet material in a press brake, or using roll-forming methods. Bending may be performed on a predetermined width of material suitable for folding into the predetermined shape. Bending may be performed on a length of sheet material of various lengths. In some examples the length of sheet material used is a multiple of the elongate length, so multiple individual separate rail piece parts are bent into shape at the same time.

In step 220 the pair of separate rail piece parts is cut from the folded part to give the elongate length. The cutting may include punching holes for the fixation of the guide rail to a hoistway, and/or for fixing the pair of separate rail piece parts together. The cutting step may include cutting out a section from the length to allow for the cut-out portion as outlined above. Cutting of the sheet material into the elongate length may be performed separately to the cutting of holes and/or the cut-out portion. The cutting of the holes and/or the cut-out portion may be performed prior to the above bending step. Cutting may be performed using any suitable method as will be apparent to those skilled in the art, for example laser cutting or punching the flat forms.

In step 230 the pair of separate rail piece parts are fixed together. The pair of separate rail piece parts are fixed together at least in the blade section so as not to interfere with the guide surface. The pair of separate rail piece parts are fixed together so that their predetermined shapes together form the blade section and the base section, and so that the blade section has the required cross-sectional width at a guide surface. In the fixing step, additional pieces of sheet material may also be fixed to the pair of separate rail piece parts, for example a blade reinforcer, a base reinforcer, or one or more stabilisers. The pieces of sheet material may be fixed together using any suitable fixing method as will be appreciated by those skilled in the art. The pair of separate rail piece parts may be mechanically joined together, for example by bolting, riveting or clinching the pieces of sheet material together. In some examples, adhesive may be used. In some examples, welding may be used.

It will be appreciated that the method steps herein described may be performed in various orders, depending on the mass production methods used, and the similarity or dissimilarity of the pair of separate rail piece parts. For example, the sheet material may first be cut to required lengths, and then be bent into shape. In some examples, the bending and the cutting may be performed using a single piece of equipment. In some examples the pair of separate rail piece parts may be bent into shape, then joined together, with cutting being the final production step.

It will be appreciated that any suitable sheet material may be used for any of the guide rail parts as disclosed above. It is advantageous for all pieces used for the same guide rail to be made from the same type of sheet material to prevent any corrosion due to material chemistry mismatch or any one part causing any other type of damage on another part. Guide rails are usually made from steel due to the advantageous properties of steel. The guide rail of the present disclosure may be made from sheet metal e.g. galvanized steel. Whilst current safety norms for elevator systems may require a particular material, it is appreciated that the present disclosure would be suitable for other types of sheet material not herein disclosed, which produce parts with suitable properties (e.g. strength, toughness, wear resistance) for making an elevator guide rail.

It will be appreciated that a guide rail cross-section may be implemented with fully symmetrical pairs of separate rail piece parts, or the pairs of separate rail piece parts may not be symmetrical, as long as they are fixed together so as to provide a continuous guide surface as a guide path (e.g. for a guiding element on a movable component in the hoistway). Similarly, although the examples shown here show a guide rail with a single blade section, the combination of folded sheet material parts fixed together in the blade section may also be used to form guide rails with multiple blade sections, which allow for two or more parallel guide paths in an hoistway.

As described above, it may be suitable to use a guide rail like that described with reference to FIGS. 6-8 in combination with another type of standard guide rail as will be known to those skilled in the art (e.g. a standard solid "T" shaped guide rail). In such examples it may be desirable to match at least the cross-section width at the guide surface 132 between the standard guide rail and a guide rail as disclosed herein, so as to have a continuous guide path for the guiding element of the movable component. It will be appreciated that the cross-section width is dependent on the combination of the sheet material thickness of the pair of separate rail piece parts. It may be possible to match additional dimensional features of a standard guide rail, however as long as there is a continuous guide path provided by continuity in the guide surface between the two types of guide rail the other dimensions of the guide rail can be dependent on the space in the hoistway in which the guide rail is mounted. In some examples the two types of guide rail may have a small gap as long as the smooth movement of the guiding element is not affected (e.g. 1 mm). In some examples the two types of guide rail are mounted separately to the hoistway. In some examples the two types of guide rail are connected together (e.g. using a fishplate bracket).

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A guide rail (100; 100'; 1000; 1000'; 1001; 1002; 1003; 1004) for an elevator system (10), the guide rail (100; 100'; 1000; 1000'; 1001; 1002; 1003; 1004) having an elongate length (L) with a cross-section perpendicular to the elongate length (L);

the cross-section comprising a base section (120) for mounting to a wall of an elevator hoistway (14), and a blade section (130), the blade section (130) extending from the base section (120);

wherein the blade section (130) comprises a guide surface (132) for interacting with a guide element (30, 34) of a component movable (12, 22) in the elevator hoistway (14);

the guide rail (100; 100'; 1000; 1000'; 1001; 1002; 1003; 1004) comprising:

a pair of separate rail piece parts (**110*a*, 110*b*; 110'*a*; 110'*b*; 1010*a*, 1010*b*; 1010*b*'; 111*a*, 111*b*; 1100*a*, 1100*b*) fixed together to form the guide rail (100; 100'; 1000; 1000'; 1001; 1002; 1003; 1004**);

wherein the pair of separate rail piece parts comprises a first rail piece part (**110*a*, 110*b*; 110'*a*; 110'*b*; 1010*a*, 1010b; 1010*b*'; 111*a*, 111*b*; 1100*a*, 1100*b*) and a second rail piece part (110*a*, 110*b*; 110'*a*; 110'*b*; 1010*a*, 1010*b*; 1010*b*'; 111*a*, 111*b*; 1100*a*, 1100*b*); the first rail piece part (110a, 110b; 110'a; 110'b; 1010a, 1010b; 1010b'; 111a, 111b; 1100a, 1100*b*) being formed from a first thickness ($t_1$, $t_2$, t) of sheet material bent to have a cross-section of a first predetermined shape, and the second rail piece part (110*a*, 110*b*; 110'*a*; 110'*b*; 1010*a*, 1010*b*; 1010*b*'; 111*a*, 111*b*; 1100*a*, 1100*b*) being formed from a second thickness ($t_1$, $t_2$, t) of sheet material bent to have a cross-section of a second predetermined shape; and wherein the first rail piece part (110*a*, 110*b*; 110'*a*; 110'*b*; 1010*a*, 1010*b*; 1010*b*'; 111*a*, 111*b*; 1100*a*, 1100*b*) and the second rail piece part (110*a*, 110*b*; 110'*a*; 110'*b*; 1010*a*, 1010*b*; 1010*b*'; 111*a*, 111*b*; 1100*a*, 1100*b*) are fixed together such the first predetermined shape and the second predetermined shape together form the base section (120) and the blade section (130), and such that the blade section (130) has a cross-sectional width ($W_1$, $W_2$, $W_3$) at the guide surface (132**) that is equal to at least the sum of the first thickness ($t_1$, $t_2$, t) and the second thickness ($t_1$, $t_2$, t);

a cut-out portion (150) for part of the elongate length (L) of the guide rail (1000. 1000'), the cut-out portion (150) removing at least a central part of the base section (120) and an adjacent part of the blade section (130) so as to leave a continuous guide surface (132) for the whole of the elongate length (L) of the guide rail (1000, 1000').

2. A guide rail according to claim 1, wherein the first thickness (t) is equal to the second thickness (t), and optionally wherein the first and second rail piece parts (**110*a*, 110*b*; 110'*a*; 110'*b*; 1010*a*, 1010*b*; 1010*b*'; 111*a*, 111*b*; 1100*a*, 1100*b***) are formed from the same type of sheet material.

3. A guide rail (100; 100'; 1000; 1000'; 1001; 1002; 1003; 1004) according to claim 1, wherein the first rail piece part (**110*a*, 110'*a*; 1010*a*, 111*a*, 1100*a*) and the second rail piece part (110*a*, 110*b*; 110'*a*; 110'*b*; 1010*a*, 1010*b*; 1010*b*'; 111*a*, 111*b*; 1100*a*, 1100*b*) are fixed together in the blade section (130**).

4. A guide rail (100; 100'; 1000; 1000'; 1001; 1002; 1003; 1004) according to claim 1, wherein the sheet material comprises a sheet metal.

5. A guide rail (100; 100'; 1000; 1000'; 1001; 1002; 1003; 1004) according to claim 1, wherein the first predetermined shape and the second predetermined shape each comprises an "L" shaped section; and wherein the cross-section of the guide rail (**110*a*, 110*b*; 110'*a*; 110'*b*; 1010*a*, 1010*b*; 1010*b*'; 111*a*, 111*b*; 1100*a*, 1100*b*) comprises a "T" shaped section formed from the pair of separate rail piece parts (110*a*, 110*b*; 110'*a*; 110'*b*; 1010*a*, 1010*b*; 1010*b*'; 111*a*, 111*b*; 1100*a*, 1100*b***) fixed together.

6. A guide rail (100; 1000; 1000'; 1001; 1002; 1003; 1004) according to claim 1, wherein the cross-sectional width ($W_2$, $W_3$) at the guide surface (132) is equal to at least double the sum of the first thickness ($t_1$, $t_2$, t) and the second thickness ($t_1$, $t_2$, t); and wherein each of the pair of separate rail piece parts (**110*a*, 110*b*; 1010*a*, 1010*b*; 1010*b*'; 111*a*, 111*b*; 1100*a*, 1100*b*) is folded back over itself to form the cross-section width ($W_2$, $W_3$) at the guide surface (132**).

7. A guide rail (1000') according to claim 1, wherein the first rail piece part and/or the second rail piece part (**1010*b*') further comprises an extended base portion (125) around the cut-out portion (150), connecting the base section (120) from either side of the cut-out portion (150**) in the elongate length (L).

8. A guide rail (100; 100'; 1000; 1000'; 1001; 1002; 1003; 1004) according to claim 7, wherein the first rail piece part (**110*a*, 110*b*; 110'*a*; 110'*b*; 1010*a*, 1010*b*; 1010*b*'; 111*a*, 111*b*; 1100*a*, 1100*b*) and the second rail piece part (110*a*, 110*b*; 110'*a*; 110'*b*; 1010*a*, 1010*b*; 1010*b*'; 111*a*, 111*b*; 1100*a*, 1100*b*) are mechanically joined by the sheet material of the first and second rail piece parts (110*a*, 110*b*; 110'*a*; 110'*b*; 1010*a*, 1010*b*; 1010*b*'; 111a, 111*b*; 1100*a*, 1100*b***) having been clinched together.

9. A guide rail (100; 100'; 1000; 1000'; 1001; 1002; 1003; 1004) according to claim 1, wherein the first rail piece part (**110*a*, 110*b*; 110'*a*; 110'*b*; 1010*a*, 1010*b*; 1010*b*'; 111*a*, 111*b*; 1100*a*, 1100*b*) and the second rail piece part (110*a*, 110*b*; 110'*a***;

**110'*b*; 1010*a*, 1010*b*; 1010*b*'; 111*a*, 111*b*; 1100*a*, 1100*b***) are mechanically joined together.

10. A guide rail (100; 100'; 1000; 1000'; 1001; 1002; 1003; 1004) according to claim 9, wherein the guide rail (100; 100'; 1000; 1000'; 1001; 1002; 1003; 1004) further comprises holes in the blade section (130) away from the guide surface (132); and wherein the pair of separate rail piece parts (**110*a*, 110*b*; 110'*a*; 110'*b*; 1010*a*, 1010*b*; 1010*b*'; 111*a*, 111*b*; 1100*a*, 1100*b*) are mechanically joined together using rivets or bolts which utilize the holes in the blade section (130**).

11. An elevator system (10) comprising:

a hoistway (14);

a component (12, 22) movable in the hoistway (14), comprising at least one guide element (30, 34);

a combined guide rail (2000) mounted to a wall of the hoistway (14), the combined guide rail (2000) comprising a standard guide rail (28, 32) and a guide rail (100; 100'; 1000; 1000'; 1001; 1002; 1003; 1004) having:

an elongate length (L) with a cross-section perpendicular to the elongate length (L);

the cross-section comprising a base section (120) for mounting to a wall of an elevator hoistway (14), and a blade section (130), the blade section (130) extending from the base section (120);

wherein the blade section (130) comprises a guide surface (132) for interacting with a guide element (30, 34) of a component movable (12, 22) in the elevator hoistway (14);

the guide rail (100; 100'; 1000; 1000'; 1001; 1002; 1003; 1004) comprising:

a pair of separate rail piece parts (**110*a*, 110*b*; 110'*a*; 110'*b*; 1010*a*, 1010*b*; 1010*b*'; 111*a*, 111*b*; 1100*a***, 1100b) fixed together to form the guide rail (100; 100'; 1000; 1000'; 1001; 1002; 1003; 1004);

wherein the pair of separate rail piece parts comprises a first rail piece part (110a, 110b; 110'a; 110'b; 1010a, 1010b; 1010b'; 111a, 111b; 1100a, 1100b) and a second rail piece part (110a, 110b; 110'a; 110'b; 1010a, 1010b; 1010b'; 111a, 111b; 1100a, 1100b); the first rail piece part (110a, 110b; 110'a; 110'b; 1010a, 1010b; 1010b'; 111a, 111b; 1100a, 1100b) being formed from a first thickness ($t_1$, $t_2$, t) of sheet material bent to have a cross-section of a first predetermined shape, and the second rail piece part (110a, 110b; 110'a; 110'b; 1010a, 1010b; 1010b'; 111a, 111b; 1100a, 1100b) being formed from a second thickness ($t_1$, $t_2$, t) of sheet material bent to have a cross-section of a second predetermined shape; and wherein the first rail piece part (110a, 110b; 110'a; 110'b; 1010a, 1010b; 1010b'; 111a, 111b; 1100a, 1100b) and the second rail piece part (110a, 110b; 110'a; 110'b; 1010a, 1010b; 1010b'; 111a, 111b; 1100a, 1100b) are fixed together such the first predetermined shape and the second predetermined shape together form the base section (120) and the blade section (130), and such that the blade section (130) has a cross-sectional width ($W_1$, $W_2$, $W_3$) at the guide surface (132) that is equal to at least the sum of the first thickness ($t_1$, $t_2$, t) and the second thickness ($t_1$, $t_2$, t);

wherein the standard guide rail (28, 32) and the guide rail (1000) have substantially similar guide surfaces (132) to smoothly guide the at least one guide element (30, 34);

wherein the standard guide rail (28, 32) is installed in a lower section of the hoistway (14), and the guide rail (1000) is installed above the standard guide rail (28, 32), and wherein the standard guide rail (28, 32) and the guide rails (1000) are arranged next to one another along the hoistway (14) to form a continuous guide path along the guide surfaces (132); and wherein the component (12, 22) is configured to move along the guide path in the hoistway (14).

12. A method for manufacturing a guide rail (100; 100'; 1000; 1000'; 1001; 1002; 1003; 1004) for an elevator system (10); the guide rail (100; 100'; 1000; 1000'; 1001; 1002; 1003; 1004) having an elongate length (L) with a cross-section perpendicular to the elongate length (L);

the cross-section comprising a base section (120) and a blade section (130), the blade section (130) extending from the base section (120); the method comprising:

providing a pair of separate rail piece parts (110a, 110b; 110'a; 110'b; 1010a, 1010b; 1010b'; 111a, 111b; 1100a, 1100b), the pair of separate rail piece parts (comprising a first rail piece part (110a, 110b; 110'a; 110'b; 1010a, 1010b; 1010b'; 111a, 111b; 1100a, 1100b) and a second rail piece part (110a, 110b; 110'a; 110'b; 1010a, 1010b; 1010b'; 111a, 111b; 1100a, 1100b); the first rail piece part (110a, 110b; 110'a; 110'b; 1010a, 1010b; 1010b'; 111a, 111b; 1100a, 1100b) being formed from a first thickness ($t_1$, $t_2$, t) of sheet material bent to have a cross-section of a first predetermined shape, and the second rail piece part (110a, 110b; 110'a; 110'b; 1010a, 1010b; 1010b'; 111a, 111b; 1100a, 1100b) being formed from a second thickness ($t_1$, $t_2$, t) of sheet material bent to have a cross-section of a second predetermined shape; and fixing together the first rail piece part (110a, 110b; 110'a; 110'b; 1010a, 1010b;

1010b'; 111a, 111b; 1100a, 1100b) and the second rail piece part (110a, 110b; 110'a; 110'b;

1010a, 1010b; 1010b'; 111a, 111b; 1100a, 1100b), such that the first predetermined shape and the second predetermined shape together form the base section (120) and the blade section (130) of the guide rail (100; 100'; 1000; 1000'; 1001; 1002; 1003; 1004), and such that the blade section (130) has a cross-sectional width ($W_1$, $W_2$, $W_3$) at the guide surface (132) that is equal to at least the sum of the first thickness ($t_1$, $t_2$, t) and the second thickness ($t_1$, $t_2$, t);

forming a cut-out portion (150) for part of the elongate length (L) of the guide rail (1000, 1000'), the cut-out portion (150) removing at least a central part of the base section (120) and an adjacent part of the blade section (130) so as to leave a continuous guide surface (132) for the whole of the elongate length (L) of the guide rail (1000, 1000").

13. A method of manufacturing a guide rail (100; 100'; 1000; 1000'; 1001; 1002; 1003; 1004) according to claim 12, wherein the method for manufacturing a guide rail (100; 100'; 1000; 1000'; 1001; 1002; 1003; 1004) further comprises:

cutting the first rail piece part (110a, 110b; 110'a; 110'b; 1010a, 1010b; 1010b'; 111a, 111b; 1100a, 1100b) of the elongate length (L) from a first thickness (t1, t2, t) of sheet material;

cutting the second rail piece part (110a, 110b; 110'a; 110'b; 1010a, 1010b; 1010b'; 111a, 111b; 1100a, 1100b) of the elongate length (L) from a second thickness ($t_1$, $t_2$, t) of sheet material;

bending the first rail piece part (110a, 110b; 110'a; 110'b; 1010a, 1010b; 1010b';

111a, 111b; 1100a, 1100b) along at least one fold line (160a, 160b) parallel to the elongate length (L) to create a cross-section of a first predetermined shape; and bending the second rail piece part (110a, 110b; 110'a; 110'b; 1010a, 1010b; 1010b'; 111a, 111b; 1100a, 1100b) along at least one fold line (160a, 160b) parallel to the elongate length (L) to create a cross-section of a second predetermined shape.

14. A method of manufacturing a guide rail (100; 100'; 1000; 1001; 1002; 1003; 1004) according to claim 12, the method further comprising:

bending a thickness ($t_1$, $t_2$, t) of sheet material along at least one fold line (160a, 160b) to create a folded part with a cross-section of a predetermined shape; and cutting the pair of separate rail piece parts (110a, 110b; 110'a; 110'b; 1010a, 1010b; 1010b'; 111a, 111b; 1100a, 1100b) from the folded part, each of the pair of separate rail piece parts (110a, 110b; 110'a; 110'b; 1010a, 1010b; 1010b'; 111a, 111b; 1100a, 1100b) having the elongate length (L).

* * * * *